(12) United States Patent
Dierkes

(10) Patent No.: US 11,097,500 B2
(45) Date of Patent: Aug. 24, 2021

(54) METHOD FOR PRODUCING A HULL WALL FROM A FIBER COMPOSITE SANDWICH COMPONENT

(71) Applicant: Faserverbund Innovations UG (haftungsbeschränkt), Ibbenbüren (DE)

(72) Inventor: Dominik Dierkes, Ibbenbüren (DE)

(73) Assignee: Faserverbund Innovations UG (haftungsbeschränkt), Ibbenbüren (DE)

( * ) Notice: Subject to any disclaimer, the term of this patent is extended or adjusted under 35 U.S.C. 154(b) by 262 days.

(21) Appl. No.: 15/957,990

(22) Filed: Apr. 20, 2018

(65) Prior Publication Data

US 2018/0304563 A1 Oct. 25, 2018

(30) Foreign Application Priority Data

Apr. 21, 2017 (DE) .................. 10 2017 108 601.3

(51) Int. Cl.
*B29C 70/86* (2006.01)
*B29C 70/54* (2006.01)
(Continued)

(52) U.S. Cl.
CPC ............ *B29C 70/86* (2013.01); *B29C 70/443* (2013.01); *B29C 70/547* (2013.01); *B29C 70/548* (2013.01); *B29C 70/682* (2013.01); *B32B 3/08* (2013.01); *B32B 3/18* (2013.01); *B32B 37/1018* (2013.01); *B32B 37/142* (2013.01); *B29L 2031/307* (2013.01); *B32B 2260/046* (2013.01);
(Continued)

(58) Field of Classification Search
CPC ... B29C 70/443; B29C 70/547; B29C 70/548; B29C 70/682; B29C 70/86; B33B 2262/046; B33B 2262/106; B33B 2262/022; B32B 2307/546; B32B 2307/72; B32B 37/142; B29L 2031/307
See application file for complete search history.

(56) References Cited

U.S. PATENT DOCUMENTS 6,187,698 B1 * 2/2001 Muller .................. D04H 1/593
442/320
2015/0122807 A1 * 5/2015 Van Loon .......... B64D 11/0007
220/4.01

FOREIGN PATENT DOCUMENTS

DE   10 2014 206 639   10/2015
DE   10 2014 222 560   5/2016
(Continued)

*Primary Examiner* — Michael M. Robinson
*Assistant Examiner* — Victoria Bartlett
(74) *Attorney, Agent, or Firm* — Gudrun E. Huckett

(57) ABSTRACT

In a method for producing a hull wall of a fiber composite sandwich component, shaped bodies of extruded polystyrene hard foam are enveloped with an envelope of fiber composite material with fibers oriented at least bidirectionally. The enveloped shaped bodies have a shape for forming a hull wall and are placed next to each other in a vacuum injection structure on a lower cover layer of fiber composite material. An upper cover layer of fiber composite material is placed on top of the enveloped shaped bodies and the vacuum injection structure is sealed. Matrix material is introduced and distributed in the vacuum injection structure until the fiber composite material of the envelopes and of the upper and lower cover layers is impregnated completely with the matrix material. The matrix material is cured and the fiber composite sandwich component of the hull wall is removed from the vacuum injection structure.

5 Claims, 1 Drawing Sheet

(51) Int. Cl.
  *B29C 70/44*   (2006.01)
  *B29C 70/68*   (2006.01)
  *B32B 3/08*   (2006.01)
  *B32B 3/18*   (2006.01)
  *B32B 37/10*   (2006.01)
  *B32B 37/14*   (2006.01)
  *B29L 31/30*   (2006.01)
  *B63B 5/24*   (2006.01)

(52) U.S. Cl.
  CPC . *B32B 2262/106* (2013.01); *B32B 2266/0228* (2013.01); *B32B 2307/546* (2013.01); *B32B 2307/726* (2013.01); *B63B 2005/242* (2013.01); *B63B 2231/52* (2013.01)

(56) References Cited

FOREIGN PATENT DOCUMENTS

| | | | | |
|---|---|---|---|---|
| WO | WO-1987005273 A1 | * | 9/1987 | ............. B63B 43/14 |
| WO | WO-2012026980 A2 | * | 3/2012 | ........... B29C 70/443 |

* cited by examiner

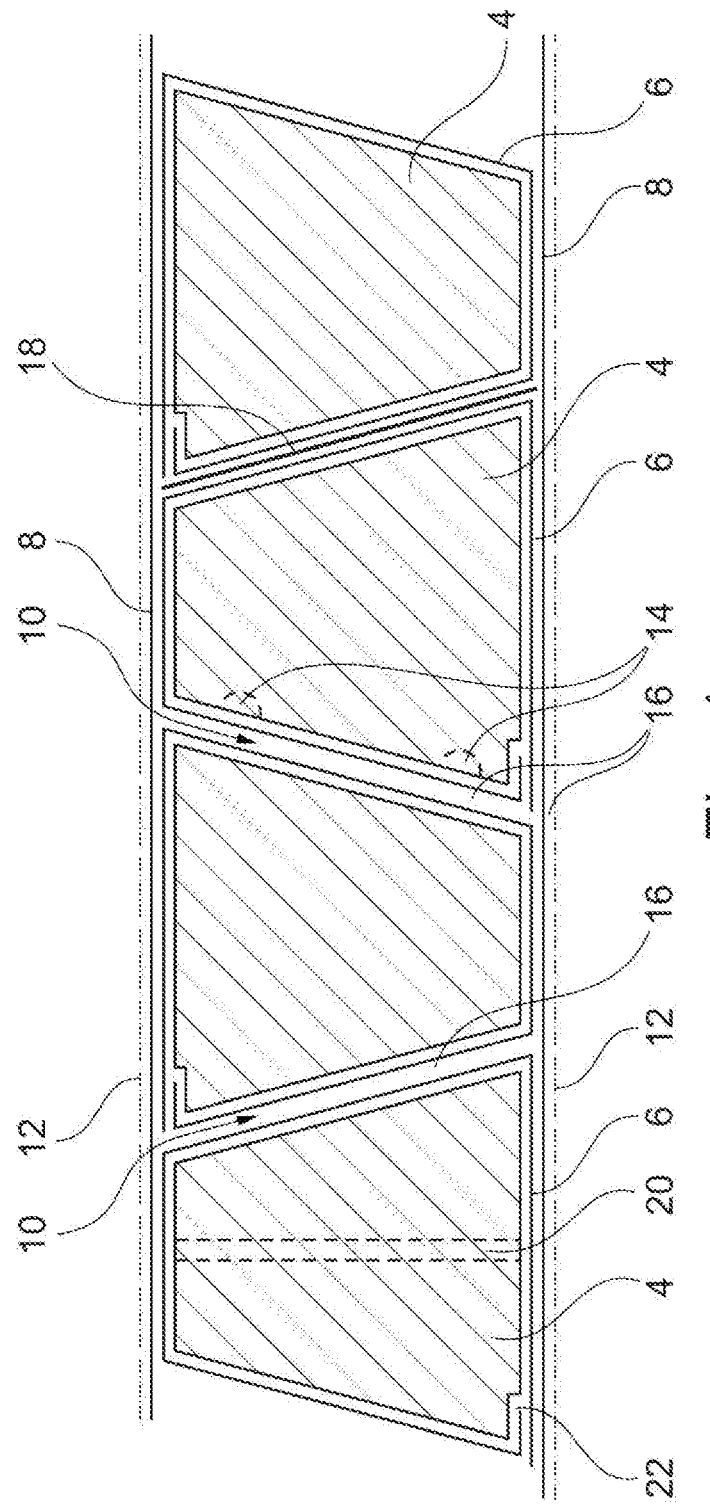

METHOD FOR PRODUCING A HULL WALL FROM A FIBER COMPOSITE SANDWICH COMPONENT

BACKGROUND OF THE INVENTION

The present invention concerns a method for producing a hull wall of a boat, wherein the hull wall is comprised of a fiber composite sandwich component.

Sandwich constructions are comprised usually of a plastic material core and two cover layers which are attached to the exterior sides of the plastic material core. An exemplary sandwich construction is disclosed, for example, in the publication DE 10 2014 206 639 A1. Due to the connection of the cover layers with the shear-stiff core, a high load capacity and a great stiffness result for the sandwich panel together with a comparatively minimal weight. Such sandwich constructions are therefore ideal for producing hull walls.

The cover layers can be produced from a fiber composite material. This is known, for example, from the publication DE 10 2014 222 560 A1. As fiber materials for the fiber composite material, for example, glass fibers, aramid fibers, carbon fibers but also natural fibers are employed. The fibers impart to the fiber composite material the required strength. In addition to the tensile strength, the fibers also create, within limits, a bending strength relative to a pressure load. The fibers are held and protected in their position by a matrix material. The matrix material transmits and distributes also tensions between the fibers. Different resin systems, for example, polyester, vinyl ester, epoxide, BMI, or phenol resins are conceivable as matrix material.

From the prior art it is known to produce such sandwich constructions with a fiber composite material by a vacuum infusion structure. In this method, the dry fiber material—for example, rovings, mats, laid fabrics, woven fabrics, and the like—are placed into a mold which is coated with a release agent. A separating fabric as well as a distribution medium that is supposed to facilitate uniform flow of the resin are placed on top. The air which is contained in the vacuum infusion structure can be evacuated, for example, by an areal membrane or a membrane placed about a vacuum hose, which membrane is gas-permeable but matrix material-tight. By means of a vacuum seal strip, the film is sealed relative to the mold and the component is subsequently evacuated by means of a vacuum pump. The air pressure presses the inserted parts together and fixes them in position. The temperate liquid resin is sucked by the applied vacuum into the fiber material. In order to prevent that excess resin after passing the fibers reaches the vacuum pump, a resin brake and/or resin trap is mounted upstream of the pump. After the fibers have been completely impregnated, the resin supply is interrupted. The impregnated fiber composite body can be removed from the mold after curing. The curing times depend on the selected matrix material and the temperature. Advantage of this method is the uniform and almost bubble-free impregnation of the fibers and thus a high quality of the produced components as well as the reproducibility.

The mechanical load capacity of sandwich constructions can be increased in that the cover layers are connected by stays with each other. Stays of a fiber composite material can be placed between the shaped bodies that form the plastic material cores. However, weak points result in the region of the connections of the fiber material of the stays with the fiber material of the cover layers when the fibers are connected with each other only by the matrix material and only in the immediate abutting region.

It is the object of the present invention to produce fiber composite sandwich components exhibiting an increased mechanical load capacity with a manufacturing expenditure as low as possible.

SUMMARY OF THE INVENTION

The object is solved by a manufacturing process with the following method steps:

a) enveloping several shaped bodies, suitably shaped respectively for forming the hull wall, of extruded polystyrene hard foam with a fiber composite material in which the fibers are at least bidirectionally oriented, b) placing the enveloped shaped bodies next to each other in a vacuum injection structure on a lower cover layer of a fiber composite material, placing an upper cover layer of a fiber composite material on top, and sealing the vacuum injection structure, c) introducing and distributing a matrix material in the vacuum injection structure until the fiber composite material is impregnated completely with the matrix material, d) curing the matrix material in the vacuum injection structure, and e) removing the finished fiber composite sandwich component from the vacuum injection structure.

According to the invention, the plastic material core of the fiber composite sandwich component is assembled of a plurality of shaped bodies whose respective division, shape, and dimensions are designed such that, after having placed all shaped bodies next to each other, approximately the shape and the dimension of the hull wall to be produced are provided. The shaped bodies, when placing them next to each other, are enveloped with the at least bidirectionally braided fiber composite material in the required material strength and fiber orientation at the locations where the fiber composite material later on is required for the precalculated target stiffness in the finished component. This is the case in particular in the region of the cover layers and of the stays. However, they can also be covered at the end faces with the fiber composite material. The shaped bodies, prior to placing them next to each other, are enveloped by the at least bidirectionally braided fiber composite material for this purpose.

Enveloping the shaped bodies can be realized, for example, in that they are directly braided around with the corresponding fibers. However, it is also possible to place a previously produced braided material or knitted material of a fiber composite material in matching dimensions onto the surface of the shaped body and to secure it thereat such that it remains thereat in the desired position until the finished component is produced. For this purpose, the fiber composite component can be, for example, clamped or glued to the shaped body. The fiber composite material must not enclose a shaped body by precisely 360° but can also envelope it to a lesser degree or over sections thereof or completely with multiple layers. In this way, also separate reinforcement strips can be applied in the edge region.

It is advantageous when the envelope of a shaped body in at least one layer extends into a transition region from the region of the cover layer into the region of a stay in order to enable in this way a good force transmission from the cover layer into the stay. Since the fibers of the fiber composite material of the stay not only stand on the surface of the fibers of the fiber composite material of the cover layer but the material of the fiber composite material of the envelope at least over sections thereof are resting on and contacting the fiber composite material of the cover layer and of the stay and are capable of guiding forces that are acting thereon about an edge of a shaped body, the strength of the finished component as a whole is significantly increased.

The shaped bodies can be shaped in a pre-manufacturing process in accordance with their respective target shape and enveloped with the fiber composite material. In this way, the arrangement of the shaped bodies in the vacuum injection structure can be accelerated and the time until the injection process is started can be significantly shortened. In the pre-manufacturing process, it is easier to position the fiber composite materials in a desired spatial arrangement, to control this, and to improve in this way the component quality. The fibers of the fiber composite materials can be applied in a precise alignment and position on the shaped body.

When placing the shaped bodies enveloped with the fiber composite material next to each other in the region of the stays, respective neighboring layers of the fiber composite material come to rest against each other. The stays are therefore defined by the shaped bodies that are placed next to each other. The fiber composite material with which the shaped bodies in the neighboring region are enveloped forms the fiber reinforcement of the stays. When both neighboring shaped bodies in this region are enveloped with fiber composite material, the neighboring layers of the fiber composite materials form a common stay after flooding of this stay with matrix material. In this stay, the layers of the fiber composite material are supported by the adjacent material of the shaped body without clearance because the entire cavity between the shaped bodies is completely filled out after flooding with matrix material. In the same way, also the layers of the fiber composite material enveloping the shaped body, which is located in the region of a cover layer, are connected well by the matrix material with the fiber composite material that is placed onto or underneath the shaped bodies as a cover layer in the vacuum injection structure. Here also the fiber composite material that envelopes a shaped body is supported without clearance by means of the matrix material which has flowed into the vacuum injection structure. Due to the shaped bodies enveloped by the fiber composite material prior to being placed next to each other, it is thus sufficient to place the shaped bodies next to each other in order to position precisely and accurate to size, in the region of the cover layers and of the stays, the quantities of fiber composite material as desired for the finished fiber composite component. Due to the shaped bodies, the position and shape of the stays is precisely defined; the stays cannot bulge during manufacture in the lamination.

The number, the course, the thickness, and the orientation of the stays predefined by the shapes of the shaped bodies depends on the static specifications in regard to the finished component. The properties of the composite can be determined by the angles of the stays as well as their thickness and the orientation of the fibers positioned therein. Also, instead of a stay with large cross section, several stays that are positioned closer to the each other with a smaller cross section can be selected in order to increase the punctiform pressure resistance. The same holds true for the material, the quantity, orientation, and thickness of the fibers in the fiber composite material. The shaped bodies can be shaped and divided precisely such that by means of the stays and their connection to the cover layers a pre-calculated target strength of the finished component is adjusted. The shaped bodies, for example, can be designed as straight or curved profile members which have a triangular cross section, a trapezoidal cross sectional shape or a rectangular or square cross sectional shape which, when placed next to each other, form an areal shape that is approximately flat or curved suitably for a hull. The shaped body can also be shaped such that a fiber composite material layer can be applied easily to the surface of the shaped body. An at least bidirectional orientation of the fibers is advantageous in order to guide forces acting on the component in at least two different directions. However, it is also possible to orient the fibers, depending on the region, in more than two directions in order to additionally increase the strength in this way.

According to the invention, the plastic material core of the fiber composite sandwich component is embodied of an extruded polystyrene hard foam. Up to known, this material has been considered by persons of skill in the art as unsuitable in order to be used in fiber composite sandwich components. In hull construction, the material is however advantageous because the cells of the extruded polystyrene hard foam are closed and of a fine pore structure so that they absorb little resin when producing the fiber composite component. This lowers the costs and the weight of the finished component. When the exterior wall of the hull is damaged, the extruded polystyrene also absorbs hardly any water because the pores are closed. Extruded polystyrene has a water absorption of <0.7%, at higher densities even <0.3%. The material is thus more damage-tolerant. Since extruded polystyrene is resistant to rotting, in case of light damages of the hull, water cannot damage the core of the component. Even though extruded polystyrene is not very heat resistant, the limited use up to 70° C. is however not critical in the hull construction. The UV sensitivity can also be neglected due to embedding of the shaped body in the fiber composite material. The extruded polystyrene hard foam can also be easily brought into any desired shapes. The three-dimensional configuration of the shaped body can also be realized by means of tools that are controlled digitally and automated so that the manufacturing quality is increased and the dimensional precision of the individual shaped bodies is improved.

Due to the comparatively minimal weight, the light material provides a high buoyance. When using an epoxide resin as matrix material, the wall of the hull is also not subjected to an osmosis risk. Even though the extruded polystyrene hard foam in comparison to conventional materials of plastic material cores has a lower modulus of rigidity, this can be compensated however by the stays which are reinforced with the fiber composite material. The modulus of rigidity of an extruded polystyrene hard foam in a quality of 45 kg/m$^3$ amounts to, for example, approximately 18 N/mm$^2$, a carbon fiber reinforced plastic material has a modulus of rigidity of approximately 15,000 N/mm$^2$. Accordingly, the combination of a shaped body produced from extruded polystyrene hard foam with the fiber-reinforced stays enables reaching a modulus of rigidity relative to the surface area of a significantly denser plastic material foam combined with a lower weight.

A further advantage which results from the use of the shaped bodies of an extruded polystyrene is seen in the elastic behavior upon overload of the hull wall. The extruded polystyrene comprises a comparatively high pressure resistance and therefore supports ideally the fiber composite material in the finished component. It does not shear off under overload from the fiber composite material but reacts elastically. When the fiber composite material moves due to a load and begins to fail, it is additionally supported by the material of the shaped bodies. In case of the extruded polystyrene there is therefore no abrupt shear yielding in the core as it happens in case of other core materials but the combination of the fiber composite material with the shaped bodies of an extruded polystyrene fails softly in two stages, i.e., first the fiber composite material and then the material of the shaped bodies of the extruded polystyrene. After the failure of the stays of the fiber composite material, the component produced according to the invention therefore participates still in a very high deformation to the point of shear yielding of the extruded polystyrene.

According to an embodiment of the invention, the shaped bodies prior to enveloping with the fiber composite material are melt-cut to their shape. In this context, for example, a thermo saw can be employed which, by a hot metal wire, causes in the contact region melting of the extruded polystyrene hard foam from which the shaped body is to be produced. When separating by melting pieces of a shaped body, the cell walls of the pores which are located in the cut region are melted together. This provides for a higher pressure resistance of the material in the cut region relative to a mechanical cut. Also, the connection of the matrix material to the surface of the shaped body is improved.

According to an embodiment of the invention, the shaped bodies have at their surface cutouts that serve as a flow aid for the matrix material. When the fiber composite material rests flat against the surface of the shaped body, the matrix material can thus distribute only slowly and tenaciously along it within the cavities of the vacuum injection structure. In order to accelerate penetration of the matrix material into the cavities, the cutouts can serve as channels through which the matrix material can distribute more quickly within the vacuum injection structure. Due to the cutouts, it can be ensured in particular that the matrix material can penetrate even into otherwise difficult-to-access regions as, for example, the regions of the stays, where otherwise a complete penetration would not be ensured.

According to an embodiment of the invention, flow aids are inserted into the cavities of the vacuum injection structure. The flow aids can be used in particular as interlaminary flow aids. Due to the flow aids, the distribution of the matrix material is improved and accelerated. Blind spots into which no matrix material might have penetrated are minimized in this way.

According to an embodiment of the invention, the shaped bodies comprise hollow channels which connect a surface section of the shaped body with another surface section. The hollow channels serve, like the afore described cutouts, for accelerating the distribution of the matrix material within the vacuum injection structure and for ensuring a uniform filling of all cavities in the vacuum injection structure with the matrix material. The hollow channels are preferably disposed in the shaped body such that a first opening of the hollow channel is located in a region of the shaped body which is reached by the flow front of the matrix material flowing into the vacuum injection structure earlier than the region of the second or a further opening of the hollow channel.

According to an embodiment of the invention, a free end of a layer of a fiber composite material is inserted into a recess in the surface of a shaped body. The recess can be, for example, a slot that is introduced into the surface into which the free end has been inserted in order to secure it there in its position and in order to facilitate enveloping of the shaped body. However, the recess can also be a flat recess that, for example, serves for compensating a double layer arrangement of the fiber composite material in the region of the flat recess so that, despite the double-layer envelope of the shaped part in this region, a flat surface results, for example, in the region of a cover layer.

It is expressly noted that the afore described configurations of the invention alone but also in any combinations with each other can be combined with the subject matter of the independent claim insofar as no technical obstacles stand in the way.

Further modifications and embodiments of the invention can be taken from the following subject matter description and the drawings.

BRIEF DESCRIPTION OF THE DRAWING

The invention will be explained in the following with the aid of an embodiment in more detail.

FIG. 1 shows a cross-section view of a finished fiber composite sandwich component.

DESCRIPTION OF PREFERRED EMBODIMENTS

In FIG. 1, a cross section view of a finished fiber composite sandwich component 2 is illustrated. In the cross section view, it is clearly visible that the fiber composite sandwich component 2 comprises a number of adjacently positioned shaped bodies 4 that are arranged next to each other such that they form a section of a wall in particular for a hull. In the embodiment, the shaped bodies 4 have a trapezoidal shape in the cross section view, but any other cross-sectional shape can be selected also. In the embodiment, the shaped bodies 4 also all have the same cross section shape but, of course, in deviation therefrom also shaped bodies 4 can be employed that have different cross-sectional shapes and are arranged next to each other. In the embodiment, the shaped bodies 4 are arranged in a nested arrangement relative to each other so that the stays 10 are oriented in different directions in order to make the fiber composite sandwich component 2 as a whole more load-resistant.

Each shaped body 4 is enveloped with a fiber composite material 6. In this way, circumferentially each shaped body 4 is covered across the entire surface area with the fiber composite material 6. In upward and downward directions, a cover layer 8 is placed respectively onto the fiber composite material 6 enveloping the shaped bodies 4. The cover layer 8 can be comprised also of a fiber composite material 6.

In the region in which the surfaces of neighboring shaped bodies 4 are facing each other, the surfaces in any case delimit the cavity 16 for a stay 10. In the cavity of the respective stay 10 two layers of the fiber composite material 6 are positioned in the embodiment. When the cavity 16 in the region of the stays 10 is filled with matrix material 12, the fiber composite materials 6 in the region of the stays 10 are connected thereby to each other. Also in the region of the cover layers 8, the matrix material 12 connects the adjacently positioned sections of the fiber composite material 6 with the respective cover layers 8. The surface of the matrix material 12 in the finished fiber composite sandwich component 2 are indicated by the two dash-dotted lines 12.

In a shaped body 4, two cutouts 14 are indicated as an example by dashed lines in the side of the surface facing the stay 10. Such cutouts 14 can serve as flow aids for the matrix material 12 through which the matrix material 12 can distribute better in the region of a stay. In the embodiment, the cutouts 14 extend transversely to the vertical axis of the stay 10; the cutouts 14 can however also extend in any other direction or their course can branch or change.

In the cross section view in FIG. 1, the cavities 16 which are still present in a vacuum injection structure are completely filled with matrix material 12 after manufacture of the finished component.

As a further embodiment, in the right stay 10 a flow aid 18 is inserted between the two layers of the fiber composite material 6 provided thereat. The flow aid can be, for example, a nonwoven through which the matrix material 12 can flow better than through the fiber composite materials 6 resting against each other. The flow aid 18 in this way can accelerate and improve the distribution of the matrix material 12 in the region of a stay 10.

In the left shaped body 4 a hollow channel 20 is indicated by dashed lines. The hollow channel 20 can serve for guiding matrix material 12, flowing in on the surface of the left shaped body 4 to the opening of the hollow channel 20, to the lower opening of the hollow channel 20 so that the matrix material can spread further there. A hollow channel 20 can contribute in this way to filling more quickly and completely the cavities 16 in a vacuum injection structure with matrix material 12.

In the shaped bodies 4 there is also a recess 22 at a location which is facing the cover layers 8. A free end of the respective fiber composite material 6 is inserted in the region of the recess 22. The recess 22 is dimensioned such that the fiber composite material 6 in the region of the recess 22 does not project upwardly or downwardly when the cover layer 8 is placed thereon. In this way, it is possible, despite individual overlapping regions of the fiber composite materials 6, to obtain as a whole a smooth and pleasing surface of the fiber composite sandwich component 2 across the entire surface of the cover layers 8. The free end of the respective fiber composite material 6 can be glued or can be fastened in another suitable way in the region of the recess 22 for better fixation.

The invention is not limited to the afore described embodiments. For a person of skill in the art it is easily possible to modify the embodiments in a way that appears suitable to him in order to adapt it to a concrete application situation.

What is claimed is:

1. A method for producing a boat hull wall comprised of a fiber composite sandwich component, the method comprising:

providing shaped bodies of extruded polystyrene hard foam, wherein the shaped bodies have a shape for forming a boat hull wall together;

providing a flat recess in a surface of the shaped bodies, respectively;

enveloping the shaped bodies of extruded polystyrene hard foam each with a separate envelope of fiber composite material comprising fibers oriented at least bidirectionally, wherein the separate envelope of fiber composite material comprises a first end and a second end positioned opposite the first end in a direction of enveloping the shaped bodies, by inserting the first end into the flat recess to compensate by the flat recess a double layer arrangement of the separate envelope of fiber composite material wrapped around the shaped bodies at the first end to obtain a smooth surface without projecting portions of the fiber composite material;

placing a continuous lower cover layer of fiber composite material into a vacuum injection structure;

placing the shaped bodies, each enveloped with the separate envelope, respectively, next to each other onto the continuous lower cover layer in the vacuum injection structure;

placing a continuous upper cover layer of fiber composite material on top of all the shaped bodies, each enveloped with the separate envelope, respectively;

sealing the vacuum injection structure;

introducing and distributing a matrix material into the vacuum injection structure until the fiber composite material of the separate envelopes and of the upper and lower cover layers is impregnated completely with the matrix material;

curing the matrix material in the vacuum injection structure to form the fiber composite sandwich component of the boat hull wall; and removing the fiber composite sandwich component of the boat hull wall from the vacuum injection structure.

2. The method according to claim 1, further comprising cutting by melting the shape of the shaped bodies prior to enveloping.

3. The method according to claim 1, further comprising providing cutouts on a surface of the shaped bodies, wherein the cutouts serve as flow aids for the matrix material.

4. The method according to claim 1, further comprising inserting flow aids into cavities of the vacuum injection structure.

5. The method according to claim 1, further comprising providing a hollow channel in one or more of the shaped bodies to connect a first surface section of the one or more shaped bodies with a second surface section of the one or more shaped bodies.

* * * * *